US011561669B2

(12) United States Patent
Chen et al.

(10) Patent No.: US 11,561,669 B2
(45) Date of Patent: Jan. 24, 2023

(54) SYSTEMS AND METHODS OF USING A DIGITAL TWIN FOR INTERACTING WITH A CITY MODEL

(71) Applicant: Ford Global Technologies, LLC, Dearborn, MI (US)

(72) Inventors: Yifan Chen, Ann Arbor, MI (US); Shan Chy Chueh, Ypsilanti, MI (US); John Vincent, Livonia, MI (US); Kangning Chen, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 190 days.

(21) Appl. No.: 17/144,310

(22) Filed: Jan. 8, 2021

(65) Prior Publication Data
US 2022/0221975 A1    Jul. 14, 2022

(51) Int. Cl.
*G06F 3/04815* (2022.01)
*G06T 7/73* (2017.01)
(Continued)

(52) U.S. Cl.
CPC ........ *G06F 3/04815* (2013.01); *G06F 3/0488* (2013.01); *G06F 3/04842* (2013.01); *G06T 7/73* (2017.01); *G06T 17/05* (2013.01); *G06T 19/006* (2013.01); *G09B 25/04* (2013.01); *G09B 29/106* (2013.01); *G06F 2203/04804* (2013.01); *G06T 2200/24* (2013.01); *G06T 2207/30204* (2013.01); *G06T 2207/30244* (2013.01); *G06T 2210/62* (2013.01)

(58) Field of Classification Search
None
See application file for complete search history.

(56) References Cited

U.S. PATENT DOCUMENTS

| 2016/0185463 | A1* | 6/2016 | Catton | H04N 17/04 |
| | | | | 701/14 |
| 2016/0189427 | A1* | 6/2016 | Wu | G06F 3/011 |
| | | | | 345/633 |
| 2019/0065027 | A1* | 2/2019 | Hauenstein | G06F 3/0484 |

FOREIGN PATENT DOCUMENTS

WO    2017015290 A1    1/2017

OTHER PUBLICATIONS

Kritzler et al, "The Virtual Twin: Controlling Smart Factories using a spatially-correct Augmented Reality Representation", Siemens Corporate Technology, Berkeley, CA., ACM Digital Library ISBN 978-1-4503-5318, Proceedings of the 7th International Conference on the Internet of Things, Oct. 2017, Article 38, 2 pages.

(Continued)

*Primary Examiner* — Frank S Chen
(74) *Attorney, Agent, or Firm* — Brandon Hicks; Eversheds Sutherland (US) LLP

(57) ABSTRACT

Systems and methods interacting with tabletop models are provided herein. A display system includes a tabletop model, including a horizontal display that is configured to display a two-dimensional digital map and a three-dimensional physical model that is configured to overlay the two-dimensional digital map. The display system includes a mobile device including a camera configured to generate a camera image. The mobile renders a model image of the three-dimensional digital and overlays a camera image of the tabletop model with the model image. The mobile device determines a selection of an object based on a touch position on the model image.

19 Claims, 3 Drawing Sheets

(51) Int. Cl.
*G06T 17/05* (2011.01)
*G06T 19/00* (2011.01)
*G06F 3/04842* (2022.01)
*G06F 3/0488* (2022.01)
*G09B 29/10* (2006.01)
*G09B 25/04* (2006.01)

(56) References Cited

OTHER PUBLICATIONS

Grube et al, "SMEs can touch Industry 4.0 in the Smart Learning Factory", Elsevier, Science Direct, Procedia Manufacturing 31 (2019), 9th Conference on Learning Factories, University of Southern Denmark, Alsion 2, Sonderborg 6400, Denmark, pp. 219-224, 2019.

* cited by examiner

US 11,561,669 B2

SYSTEMS AND METHODS OF USING A DIGITAL TWIN FOR INTERACTING WITH A CITY MODEL

BACKGROUND

Tabletop models, such as a model of transportation operating system (TOS), allow users to explore features and objects of the model. However, interacting with the tabletop model may be difficult, for example, where objects are out of physical reach of a user.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
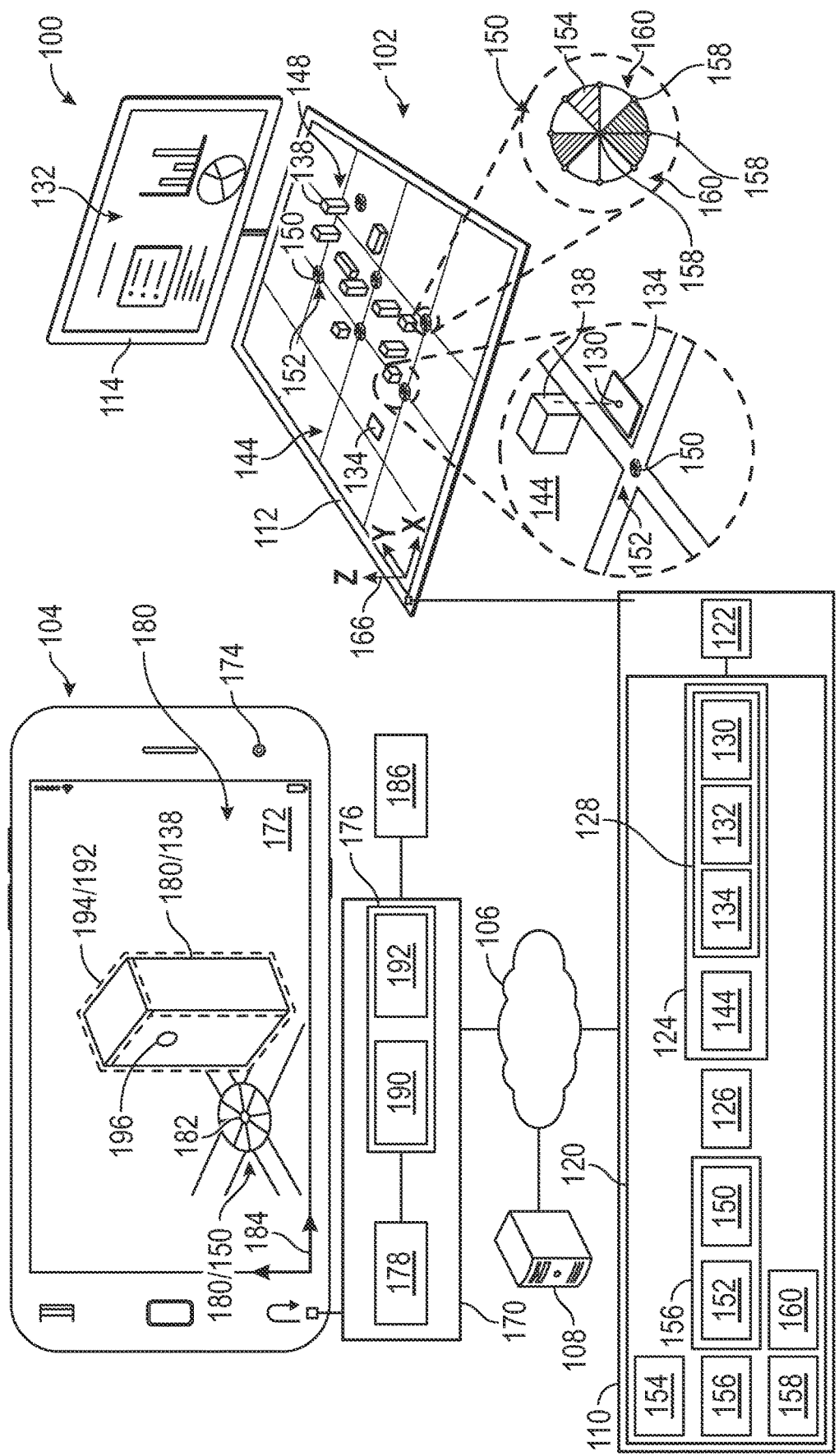
FIG. 1 depicts a display system including a tabletop model and a mobile device in accordance with the disclosure.

Referring to FIG. 1, a display system 100 includes a tabletop model 102 and a mobile device 104. The tabletop model 102 and the mobile device 104 may communicate with one another over a network 106. The tabletop model 102 includes a display computer 110, a horizontal display 112 (e.g., a tabletop display), and a vertical display 114. The horizontal display 112 includes a first coordinate system 116.

The display computer 110 includes a memory 120 and a processor 122. The memory 120 includes geospatial data 124. The geospatial data 124 includes feature data such as event data 126 and object data 128. The display computer 110 is configured to compile and format the geospatial data 124 to generate a map image of a two-dimensional digital map 144 (e.g., a planner representation) of a geographical area. The display computer 110 displays the two-dimensional digital map 144 on the horizontal display 112.

Object data 128 includes an object location 130 and attribute information 132. Upon selection of an object, the attribute information 132 may be displayed on the vertical display 114.

The object data 128 includes a two-dimensional digital object 134 for use with the two-dimensional digital map 144. The two-dimensional digital object 134 is positioned at the associated object location 130 on the two-dimensional digital map 144.

Figure 2:
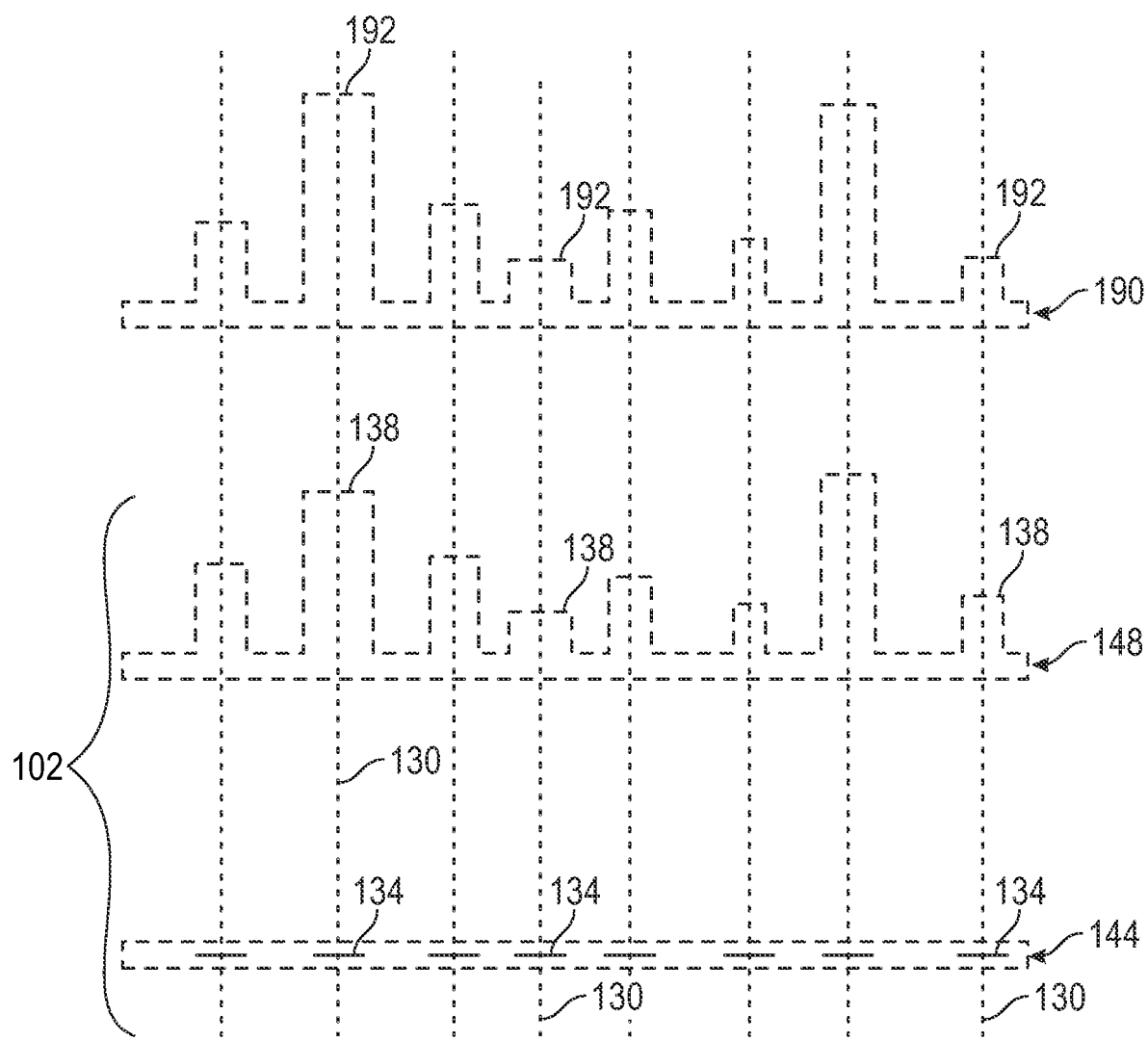
FIG. 2 depicts a two-dimensional digital map, a three-dimensional physical model, and a three-dimensional digital model in accordance with the present disclosure.

Referring to FIGS. 1 and 2, a three-dimensional physical model 148 overlays the two-dimensional digital map 144. The three-dimensional physical model 148 includes three-dimensional physical objects 138.

The two-dimensional digital map 144 also includes markers 150 at marker locations 152. Each marker location 152 on the two-dimensional digital map 144 is a coordinate of the coordinate system 116 such that the marker locations 152, and distances and spatial relationships between the markers 150, are known.

Each marker 150 includes a unique pattern 154 and other marker characteristics that are configured to be detected by image processing, pattern recognition, and/or other computer vision techniques. The pattern 154 can be encoded and read as an n-bit code to access associated marker information 156. The marker information 156 may include a name of the marker 150, the marker location 152, and spatial relationships (e.g., distances to, directions to) with other markers 150.

The mobile device 104 is or includes a mobile device computer 170, a touchscreen display 172, and a camera 174. The mobile device computer 170 includes a memory 176 and a processor 178. Broadly, the mobile device 104 is configured to interact with the objects of the tabletop model 102.

The camera 174 is configured to capture a camera image 180 (e.g., image data) of the tabletop model 102 including the three-dimensional physical objects 138 of the three-dimensional physical model 148 and the markers 150 of the two-dimensional digital map 144.

The mobile device 104 is configured to determine an image location 182 of each marker 150 (and/or each vertex 158) in the camera image 180 on a screen coordinate system 184.

The mobile device 104 includes a computer vision application that is configured to perform image processing, pattern recognition, and/or other computer vision techniques to read the patterns 154 of the markers 150 in the camera image 180 and obtain the marker locations 152 of each marker 150 from the associated marker information 156.

The mobile device 104 determines a transformation matrix (e.g., a camera model) that relates the image location 182 of a marker 150 in the camera image 180 and the marker location 152 of the marker 150. The transformation matrix reflects the pose of the camera 174 including the location and the orientation of the camera 174.

As the image locations 182 of markers 150 are known (e.g., determined from the camera image 180) and the marker locations 152 of the markers 150 are known (e.g., the marker location 152 is accessed from the marker information 156), the elements of the transformation matrix may be determined, for example, using an iterative optimization method. A pose of the camera 174, including the orientation and position of the camera 174, can be determined from the elements of the transformation matrix.

The mobile device 104 includes an inertial measurement unit (IMU) 186 that includes one or more sensors that measure force, angular rate, orientation, direction and the like. The sensors may include, for example, an accelerometer, a gyroscope, and a magnetometer. Changes to the calibrated pose of the camera 174 may be determined with inertial measurements from the IMU 186 to estimate the current pose of the camera 174 in real time.

The mobile device 104 is configured to overlay the camera image 180 of the tabletop model 102 with a model image 194 of a three-dimensional digital model 190. Referring momentarily to FIG. 2, the three-dimensional digital model 190 may be a three-dimensional digital representation of the three-dimensional physical model 148.

The three-dimensional digital model 190 includes three-dimensional digital objects 192. The three-dimensional digital objects 192 may be three-dimensional digital representations of the three-dimensional physical objects 138. The three-dimensional digital objects 192 have the same object location 130 as an associated two-dimensional digital object 134.

The position, scale, and rotation of the three-dimensional digital model 190 may be calculated according to a given location and orientation of a theoretical or virtual camera. As such, the mobile device 104 can render a model image 194 of the three-dimensional digital model 190 at a scale, position, and perspective to overlay the camera image 180 by aligning the pose of the virtual camera and the pose of the camera 174 (e.g., as determined above).

The mobile device 104 overlays the model image 194 of the three-dimensional digital model 190 over the camera image 180 of the three-dimensional physical model 148 obtained from the camera 174, making it appear on the touchscreen 172 as if the three-dimensional digital model 190 is part of the tabletop model 102.

Once the model image 194 of the three-dimensional digital model 190 is positioned to overlay the camera image 180 of the three-dimensional physical model 148 obtained from the camera 174, the mobile device 104 can be used to select an object of the tabletop model 102. To select an object, the touchscreen display 172 of the mobile device can be touched at a touch position 196 on the model image 194 of a three-dimensional digital object 192. As the model image 194 of the three-dimensional digital object 192 overlays the camera image 180 of the three-dimensional physical model 148, the touch position 196 is also on the camera image 180 of the three-dimensional physical object 138.

Upon selection of an object, the associated attribute information 132 may be accessed and displayed on the vertical display 114.

Illustrative Embodiments

Referring to FIG. 1, the display system 100 includes the tabletop model 102 and the mobile device 104. The tabletop model 102 and the mobile device 104 may communicate with one another over the network 106.

The network 106 may include any one or a combination of multiple different types of networks, such as cable networks, the Internet, wireless networks, and other private and/or public networks. In some instances, the network 106 may include cellular, Wi-Fi, or Wi-Fi direct.

Functions disclosed herein can be executed by the tabletop model 102, the mobile device 104, and/or a server 108. The server 108 may communicate with the tabletop model 102 and/or the mobile device 104 over the network 106. For example, the functions of the display system 100 may be centralized or decentralized among the elements of the display system 100.

The tabletop model 102 includes the display computer 110, the horizontal display 112 (e.g., a tabletop display), and the vertical display 114. FIG. 1 includes a perspective view of the horizontal display 112 and the vertical display 114. The horizontal display 112 includes the first coordinate system 116.

The horizontal display 112 may be a light emitting diode (LED) tabletop display for use in a transportation operating system (TOS) model. For example, the horizontal display 112 may provide a map of city streets or a geographical area.

The display computer 110 includes the memory 120 and the processor 122. The memory 120 stores instructions that are executed by the processor 122 to perform aspects of methods disclosed herein. When referring to operations executed by the display computer 110, it will be understood that this may include the execution of instructions by the processor 122.

The memory 120 includes geospatial data 124. The geospatial data 124 includes feature data such as event data 126 and object data 128. The display computer 110 is configured to compile and format the geospatial data 124 to generate a map image of the two-dimensional digital map 144 (e.g., a planner representation) of a geographical area. The display computer 110 displays the two-dimensional digital map 144 on the horizontal display 112.

Event data 126 may include traffic information, environmental information (e.g., from a weather station), temporal information (e.g., the time period at which the event exists), and the like.

Objects may include roads, buildings, districts, neighborhoods, bodies of water, parks, vehicles, pedestrians, public transportation systems, and the like. For purposes of illustration, a building is discussed in further detail below as an exemplary object.

Object data 128 includes an object location 130 and attribute information 132. For example, the object location 130 is x, y, z coordinates on the first coordinate system 116 of the horizontal display 112. The attribute information 132 (e.g., characteristics of the object) may include descriptions, statistics, graphics, and other information associated with the object. Upon selection of an object, the attribute information 132 may be displayed on the vertical display 114.

The object data 128 includes a two-dimensional digital object 134 for use with the two-dimensional digital map 144. The two-dimensional digital object 134 is positioned at the associated object location 130 on the two-dimensional digital map 144. The two-dimensional digital object 134 may be a footprint, graphical representation, or two-dimensional digital polygon-shaped cross-sectional area. The two-dimensional digital object 134 may define an area of connected streets or the footprint of a building.

The horizontal display 112 can be controlled to alter any of a hue, intensity, color, brightness, and/or other similar attribute of the two-dimensional digital object 134. For example, after selection of an object, the display computer 110 may change a color or intensity of light of the associated two-dimensional digital object 134 to highlight the object.

Referring to FIGS. 1 and 2, the three-dimensional physical model 148 overlays the two-dimensional digital map 144. The three-dimensional physical model 148 includes three-dimensional physical objects 138.

The scale of the two-dimensional digital map 144 and the scale of the three-dimensional physical model 148 are selected, and the three-dimensional physical model 148 is positioned on the two-dimensional digital map 144, such that a three-dimensional physical object 138 has the object location 130 of a corresponding two-dimensional digital object 134 (e.g., vertically aligned with one another as shown in FIG. 2). The three-dimensional physical object 138 overlays the corresponding two-dimensional digital object 134.

The three-dimensional physical model 148 may be printed or manufactured with a translucent material such as a polymer or glass. As described above, the display computer 110 is configured to change the color, brightness, etc. of the two-dimensional digital object 134, for example, to highlight a selected object via the two-dimensional digital map 144. When a two-dimensional digital object 134 is highlighted, light from the two-dimensional digital object 134 is transmitted through the aligned three-dimensional physical object 138 to illuminate and highlight the three-dimensional physical object 138.

Continuing with FIG. 1, the two-dimensional digital map 144 also includes markers 150 at marker locations 152. For example, a marker location 152 is an intersection of the road network. Each marker location 152 on the two-dimensional digital map 144 is a coordinate of the coordinate system 116 such that the marker locations 152, and distances and spatial relationships between the markers 150, are known.

Each marker 150 includes a unique pattern 154 and other marker characteristics that are configured to be detected by image processing, pattern recognition, and/or other computer vision techniques. The pattern 154 can be encoded and read as an n-bit code to access associated marker information 156. The marker information 156 may include a name of the marker 150, the marker location 152, and spatial relationships (e.g., distances to, directions to) with other markers 150.

Marker characteristics can include an area or areas of the marker 150, vertices 158 on the pattern 154, and spatial relationships between the vertices 158 (e.g., lines or contours and distances between the vertices 158). As with the marker locations 152, each vertex location 160 is a coordinate of the coordinate system 116 such that the vertex locations 160, and distances and spatial relationships between the vertices 158, are known.

The mobile device 104 includes the mobile device computer 170, the touchscreen display 172, and the camera 174. The mobile device computer 170 includes the memory 176 and the processor 178. Broadly, the mobile device 104 is configured to interact with the objects of the tabletop model 102.

The camera 174 is configured to capture a camera image 180 (e.g., image data) of the tabletop model 102 including the three-dimensional physical objects 138 of the three-dimensional physical model 148 and the markers 150 of the two-dimensional digital map 144. The number and arrangement of the markers 150 may be selected to place the markers 150 close to three-dimensional physical objects 138 so that three-dimensional physical objects 138 and markers 150 are captured in a camera image 180.

The mobile device 104 is configured to determine an image location 182 of each marker 150 (and/or each vertex 158) in the camera image 180 on a screen coordinate system 184.

The mobile device 104 includes a computer vision application that is configured to perform image processing, pattern recognition, and/or other computer vision techniques to read the patterns 154 of the markers 150 in the camera image 180 and obtain the marker locations 152 of each marker 150 from the associated marker information 156.

The mobile device 104 determines a transformation matrix (e.g., a camera model) that relates the image location 182 of a marker 150 in the camera image 180 and the marker location 152 of the marker 150. The transformation matrix reflects the pose of the camera 174 including the location and the orientation of the camera 174.

The orientation of the camera 174 can be expressed as a rotation matrix (e.g., as rotation angles). The location of the camera 174 can be expressed by a translation vector. The transformation matrix may also include camera-specific adjustments such as for focal length, image sensor orientation, and size.

As the image locations 182 of markers 150 are known (e.g., determined from the camera image 180) and the marker locations 152 of the markers 150 are known (e.g., the marker location 152 is accessed from the marker information 156), the elements of the transformation matrix may be determined, for example, using an iterative optimization method. A pose of the camera 174, including the orientation and position of the camera 174, can be determined from the elements of the transformation matrix.

The mobile device 104 includes an inertial measurement unit (IMU) 186 that includes one or more sensors that measure force, angular rate, orientation, direction and the like. The sensors may include, for example, an accelerometer, a gyroscope, and a magnetometer. Changes to the calibrated pose of the camera 174 may be determined with inertial measurements from the IMU 186 to estimate the current pose of the camera 174 in real time. For example, visual inertia odometry (VIO) or current odometry and mapping (OCM) may be used.

The mobile device 104 is configured to overlay the camera image 180 of the tabletop model 102 with a model image 194 of a three-dimensional digital model 190. Referring momentarily to FIG. 2, the three-dimensional digital model 190 may be a three-dimensional digital representation of the three-dimensional physical model 148. For example, the three-dimensional digital model 190 is generated from a scan of the three-dimensional physical model 148 or is a computer assisted design (CAD) model of a city or geographical area.

The three-dimensional digital model 190 includes three-dimensional digital objects 192. Each may include at least the basic dimensions of an object (e.g., a rectangular prism may model a building). However, more complicated three-dimensional models can also be used.

The three-dimensional digital objects 192 may be three-dimensional digital representations of the three-dimensional physical objects 138. The three-dimensional digital objects 192 have the same object location 130 as an associated two-dimensional digital object 134. The three-dimensional digital model 190 may also include virtual markers that have the marker locations 152.

Continuing with FIG. 1, the position, scale, and rotation of the three-dimensional digital model 190 may be calculated according to a given location and orientation of a theoretical or virtual camera. As such, the mobile device 104 can render a model image 194 of the three-dimensional digital model 190 at a scale, position, and perspective to overlay the camera image 180 by aligning the pose of the virtual camera and the pose of the camera 174 (e.g., as determined above).

The mobile device 104 overlays the model image 194 of the three-dimensional digital model 190 over the camera image 180 of the three-dimensional physical model 148 obtained from the camera 174, making it appear on the touchscreen 172 as if the three-dimensional digital model 190 is part of the tabletop model 102.

The model image 194 can be made transparent or translucent such that the camera image 180 of the three-dimensional physical model 148 is at least partially visible through the model image 194. Similarly, at least some portions of the model image 194 (e.g., portions that correspond to three-dimensional digital objects 192 or other features that can be selected to provide additional information) may have a color, tint, or hue.

Once the model image 194 of the three-dimensional digital model 190 is positioned to overlay the camera image 180 of the three-dimensional physical model 148 obtained from the camera 174, the mobile device 104 can be used to select an object of the tabletop model 102. To select an object, the touchscreen display 172 of the mobile device can be touched at a touch position 196 on the model image 194 of a three-dimensional digital object 192. As the model image 194 of the three-dimensional digital object 192 overlays the camera image 180 of the three-dimensional physical model 148, the touch position 196 is also on the camera image 180 of the three-dimensional physical object 138.

Upon selection of an object, the associated attribute information 132 may be accessed and displayed on the vertical display 114.

The three-dimensional digital model 190 includes polygons (e.g., a polygon mesh). One or more polygons define the surfaces of an object and are associated with the object. For example, referring to FIG. 3, three-dimensional digital objects 192 are defined by triangles 200, 202.

Figure 3:
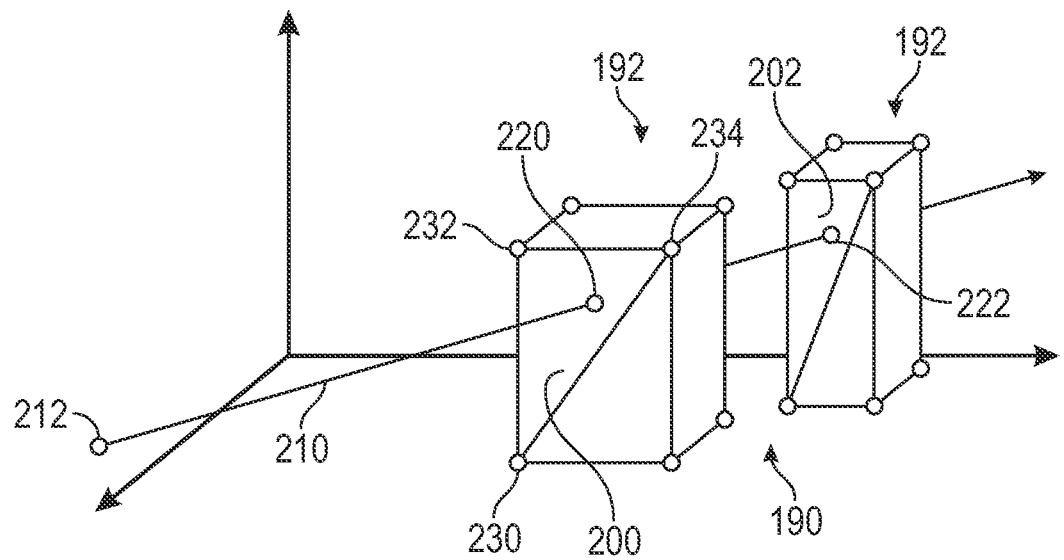
FIG. 3 depicts an intersection of a ray with an object of a three-dimensional digital model in accordance with the present disclosure.

Referring to FIG. 3, a ray 210 is defined by the touch position 196 and the orientation of the camera 174. The touch position 196 defines an origin point 212 of the ray 210. The direction of the ray 210 is based on the orientation of the camera 174.

The mobile device 104 identifies intersection points 220, 222 between the ray 210 and the triangles 200, 202 of the three-dimensional digital model 190, for example, using ray-polygonal model intersection methods.

As an example, the triangle 200 has three vertices 230, 232, 234. To get the intersection point 220 of ray 210 with the triangle 200, the mobile device 104 first determines the intersection point 220 of ray 210 with a plane in which the triangle 200 lies. An intersection point 220 may be mathematically defined as p=O+td, where p is the intersection point 220, O is the origin point 212 of the ray 210, t is the distance from the origin point 212 to the intersection point 220, and d is the direction of the ray 210. Here, the point p may be determined by solving for the distance t where the intersection between the ray 210 and the plane of the triangle 200 occurs.

Once the intersection point 220 for the plane is determined, the mobile device 104 determines if the intersection point 220 is in the triangle 200. For example, the parametric plane equation may be used.

If the vertices 230, 232, 234 are labeled a, b, and c, any point p on the plane can be given by a+β (b−a)+γ(c−a), where β is a multiplier of the vector from point a to point b and γ is a multiplier of the vector from point a to point c. The point p is in the triangle 200 if there is a solution to p=a+β (b−a)+γ(c−a) where 0≤β, 0≤γ, and β+γ≤1.

The intersection point 220 and the multipliers to determine whether the intersection point 220 is in the triangle 200 can also be solved simultaneously using a set of three linear equations in matrix form.

If there is more than one triangle 200, 202 with an intersection point 220, 222, the triangle 200 with the intersection point 220 that is nearest to the origin point 212 of the ray 210 (e.g., the smallest distance t) is selected. The three-dimensional digital object 192 that includes the selected triangle 200 is the selected three-dimensional digital object 192.

Attribute information 132 for the selected three-dimensional digital object 192 can be gathered and displayed, for example, on the vertical display 114.

Figure 4:
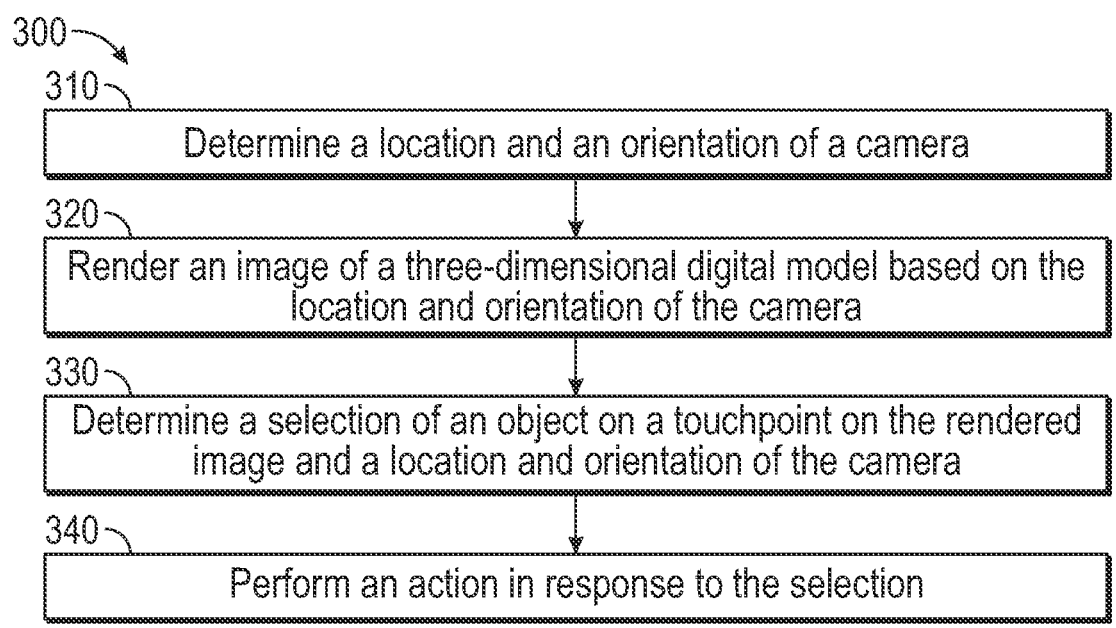
FIG. 4 depicts a method of interacting with an object of a tabletop model in accordance with the present disclosure.

FIG. 4 is a flowchart of an example method 300 of the present disclosure. The method 300 can be performed by the tabletop model 102 and the mobile device 104.

According to a first step 310, the mobile device 104 determines a location and an orientation of the camera 174. The first step 310 includes reading a pattern 154 of a marker 150 from a camera image 180 of a tabletop model 102 and accessing marker information 156 including a marker location 152. The first step 310 also includes determining an image location 182 of the marker 150 in the camera image 180. The first step 310 further includes determining the location and orientation of the camera 174 based on the marker location 152 and the image location 182 of the marker 150.

According to a second step 320, the mobile device 104 renders a model image 194 of a three-dimensional digital model 190 with a position, scale, and rotation based on the location and orientation of the camera 174. The second step 320 includes overlaying a camera image 180 of a tabletop model 102 with the model image 194 of the three-dimensional digital model 190.

According to a third step 330, the mobile device 104 determines a selection of an object based on a touch position 196 on the model image 194 and a location and orientation of the camera 174.

According to a fourth step 340, the display system 100 performs an action in response to the selection. The action may include displaying attribute information 132 related to the selected object on a second display and highlighting a two-dimensional digital object on a horizontal display of the tabletop model 102.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more Application Specific Integrated Circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

The invention claimed is:

1. A display system, comprising:
    a tabletop model, including:
        a horizontal display that is configured to display a two-dimensional digital map, the two-dimensional digital map including a marker at a marker location; and
        a three-dimensional physical model that is configured to overlay the two-dimensional digital map; and
    a mobile device comprising:
        a camera configured to generate a camera image;
        a processor; and
        a memory comprising computer executable instructions that, when executed by the processor, cause the processor to:
            read a pattern of the marker in the camera image to determine the marker location;
            determine an image location of the marker in the camera image; and determine a location and orientation of the camera based on the marker location and the image location;

render a model image of a three-dimensional digital model based on the location and orientation of the camera;

overlay a camera image of the tabletop model with the model image; and determine a selection of an object based on a touch position on the model image.

2. The display system of claim 1, wherein the two-dimensional digital map includes a two-dimensional digital object.

3. The display system of claim 2, wherein the object is a building and the two-dimensional digital object is a footprint of the building.

4. The display system of claim 2, wherein an attribute of the two-dimensional digital object is configured to change in response to the selection of the object.

5. The display system of claim 2, wherein the three-dimensional physical model includes a three-dimensional physical object.

6. The display system of claim 5, wherein the three-dimensional physical object is aligned with the two-dimensional digital object.

7. The display system of claim 5, wherein the three-dimensional physical model is transparent or translucent.

8. The display system of claim 1, wherein the marker location is at an intersection of a road network of the two-dimensional digital map.

9. The display system of claim 1, wherein the pattern is associated with the marker location.

10. The display system of claim 1, wherein a transformation matrix relates the marker location and the image location.

11. The display system of claim 1, wherein the mobile device includes an inertial measurement unit and the location and orientation of the camera is determined based on measurements from the inertial measurement unit.

12. The display system of claim 1, wherein the three-dimensional digital model is a digital representation of the three-dimensional physical model.

13. The display system of claim 1, wherein the three-dimensional digital model includes three-dimensional digital objects.

14. The display system of claim 13, wherein the three-dimensional digital objects include at least one polygon.

15. The display system of claim 14, wherein the touch position and the orientation of the camera defines a ray and the selection of the object includes determining an intersection point of the ray with the polygon.

16. The display system of claim 13, wherein the model image includes at least one portion that includes a color, tint, or hue, wherein the at least one portion includes a three-dimensional digital object.

17. The display system of claim 1, wherein the model image is at least partially transparent.

18. The display system of claim 1, wherein a virtual camera of the three-dimensional digital model is aligned with the location and orientation of the camera.

19. A method, comprising:

determining a location and orientation of a camera of a mobile device, including:

reading a pattern of a marker from a camera image of a tabletop model and accessing associated marker information including a marker location; and determining an image location of the marker in the camera image;

rendering a model image of a three-dimensional digital model based on the location and orientation of the camera;

overlaying a camera image of the tabletop model with the model image;

determine a selection of an object based on a touch position on the model image and highlighting a two-dimensional digital object on a horizontal display of the tabletop model, wherein the two-dimensional digital object is associated with the selected object.

* * * * *